Aug. 29, 1933.  G. W. SCHUTMAAT  1,924,133
TRANSPLANTER
Filed July 5, 1928

INVENTOR
George W. Schutmaat
BY Chappell & Earl
ATTORNEYS

Patented Aug. 29, 1933

1,924,133

UNITED STATES PATENT OFFICE 1,924,133

TRANSPLANTER

George W. Schutmaat, Hamilton, Mich., assignor to Hamilton Manufacturing Company, Hamilton, Mich.

Application July 5, 1928. Serial No. 290,399

2 Claims. (Cl. 111—3)

The main objects of this invention are:

First, to provide a transplanter which is well adapted for the transplanting of celery and other small or delicate plants and is of large capacity.

Second, to provide a planter which is not likely to injure the plants.

Third, to provide a transplanter having these advantages which is very economical and simple in structure and easy to operate.

Objects pertaining to details and economies of my invention will definitely appear from the description to follow. The invention is defined in the claims.

A structure embodying the features of my invention is clearly illustrated in the accompanying drawing in which.

Figure 1:
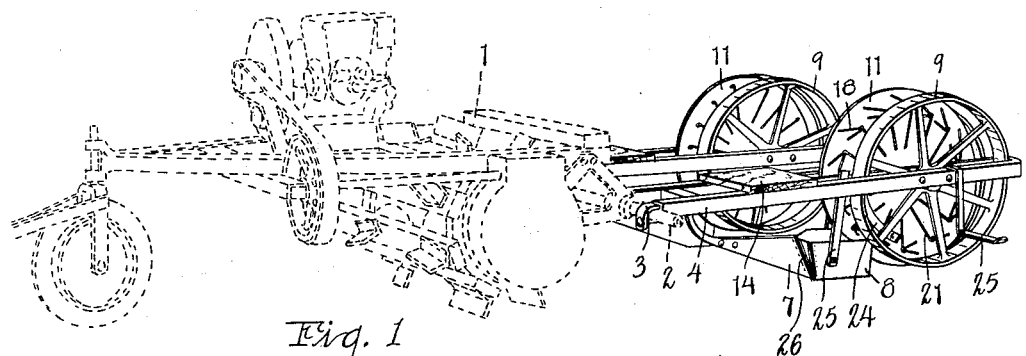
Fig. 1 is a perspective view of a transplanter embodying the features of my invention, a propelling or power unit being illustrated by dotted lines.
Figure 2:
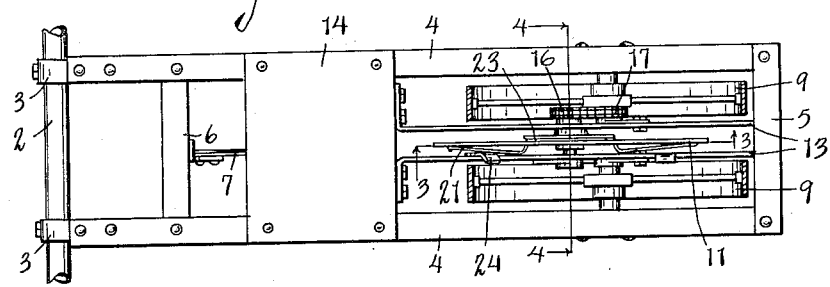
Fig. 2 is a fragmentary plan view showing one of the transplanting units, the structure illustrated being a double planter, that is, adapted for simultaneously transplanting two rows.
Figure 3:
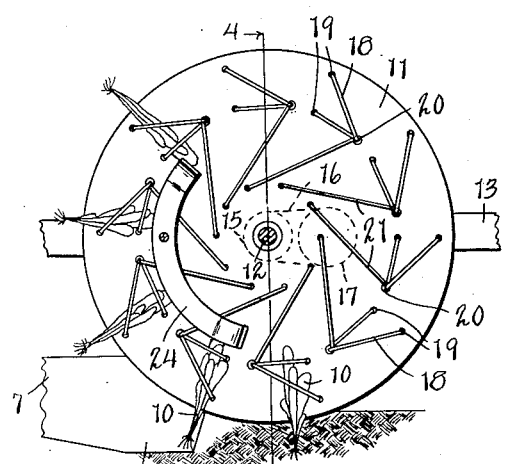
Fig. 3 is a detail longitudinal section on line 3—3 of Figs. 2 and 4.

Referring to the drawing, 1 represents a motor driven power unit or tractor. As the details of this form no part of my present invention they are not illustrated herein.

At the rear of this tractor or power unit is a transversely disposed draft bar 2 to which the forward ends of the transplanter unit frames are connected as by means of the clips 3. These frames in the embodiment illustrated consist of spaced longitudinal members 4 connected by suitable cross pieces as 5 and 6. The furrow opener 7 is connected at its front end to the cross piece 6 and is provided with rearwardly diverging wings 8.

Figure 4:
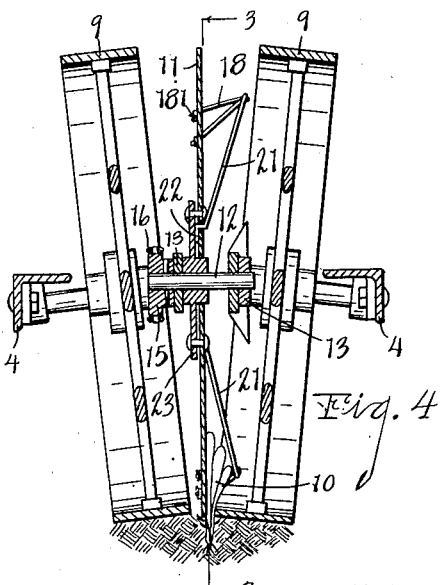
Fig. 4 is a transverse section on line 4—4 of Figs. 2 and 3.

Carrying and press wheels 9 are mounted on the frame with their axes in oppositely inclined relation as shown in Fig. 4. The press wheels are spaced so as to permit the plants as 10 to pass between them, pressing the earth upon the same as the press wheels move forwardly.

In advance of but adjacent to the press wheels I mount a disk-like carrier 11, the spindle 12 of which is carried by the spaced bars 13. The front ends of these bars are secured to the seat 14 and their rear ends to the rear cross piece 5. The spindle 12 is provided with a sprocket wheel 15 connected by the chain 16 to a sprocket wheel 17 on one of the press wheel spindles so that the carrier is positively rotated at a peripheral speed equal to the speed at which the machine travels over the ground or somewhat faster.

The carrier is provided with a plurality of holders each comprising flexible non-elastic gripper members 18 which are formed of cords, the ends of the cords being passed through radially spaced holes 19 in the carrier disk and retained therein as by means of knots 181 in the embodiment illustrated. The bights of the loops are engaged with eyes 20 formed in the ends of the spring arms 21. These spring arms are arranged tangentially on the face of the carrier disk, the arms having offset ends 22 disposed through holes in the disk and clamped between the disk and the hub-flange 23, thereby fixedly securing the arms in position. By this means the grippers are normally held yieldingly away from the side of the carrier so that a plant 10 may be laid between the grippers and the side of the carrier with its roots projecting beyond the edge thereof. The arms 21 also hold the grippers under longitudinally yielding tension, that is, they hold them yieldingly extended.

As the carrier disk is rotated the holder arms 21 are successively engaged by the segmental cam 24 which is mounted on one of the bars 13 adjacent the side of the carrier, the holders being closed by the cam and held in closed position until the plants are carried between the wings of the furrow opener and into proper position to receive the earth which is pressed thereon by the press wheels.

As the carrier disk rotates the carriers are moved rearwardly from discharging position so that the plants are released and left in upright position. The operator positioned on the seat 14 places the plants between the grippers and the side of the carrier and the flexible holders are closed upon the plants, effectively supporting them without injury.

The spring arms 21 may be formed of wire or light rods of proper gage and may be readily mounted so that the several grippers are held under quite uniform tension.

Footrests 25 are provided for the operator.

The furrow opener is provided with an arm 26 coacting with the longitudinal frame members 4 to support the furrow opener laterally while permitting vertical movement of its rear end.

I have illustrated and described my improvements in an embodiment which I have found very practical. I have not attempted to illustrate various embodiments or adaptations which might be desirable for handling special forms of plants or roots as it is believed that this disclosure will enable those skilled in the art to embody or adapt my improvements as may be desired.

Having thus described my invention what I claim as new and desire to secure by Letters Patent is:

1. A transplanter comprising a carrier, a plant holder comprising a spring arm mounted on said carrier, a gripper of flexible non-elastic material having one end secured to the carrier and its other end to said spring arm whereby the gripper is held under continuous longitudinal spring stress and normally in plant receiving position, and means coacting with said arm as the holder is moved forwardly by the carrier for closing said gripper and holding it in closed position during a portion of its travel.

2. A transplanter comprising a carrier, grippers of flexible non-elastic material formed in loops, the ends of the grippers being secured to the carrier, spring arms with which the bights of the loops are slidably engaged secured to said carrier so that the gripper members are held under continuous longitudinal spring stress and normally away from the carrier to receive a plant, and means for closing said holders and holding them in closed position while moving from receiving to discharging position.

GEORGE W. SCHUTMAAT.